Oct. 7, 1952

W. N. MOSS 2,612,915

MORTISING ATTACHMENT FOR DRILL PRESSES

Filed Oct. 6, 1948

INVENTOR
WILLIAM N. MOSS

Ernest E Carter
ATTORNEY

Patented Oct. 7, 1952

2,612,915

UNITED STATES PATENT OFFICE 2,612,915

MORTISING ATTACHMENT FOR DRILL PRESSES

William N. Moss, Vancouver, British Columbia, Canada

Application October 6, 1948, Serial No. 53,069

1 Claim. (Cl. 144—72)

My invention relates to improvements in mortising attachment for a drill press.

The object of the invention is to provide a transmission housing capable of vertical movement with the quill of a drill press, in which means are provided for supporting a mortising chain and its sprocket train; to provide means for operatively connecting the sprocket train to the drill spindle, and to provide means for slidably supporting a foot from the transmission housing for preventing the wood being mortised from being split as the mortising cutters emerge from the mortise being cut. A further object is to provide a mounting for the sprocket shaft which can be readily removed from the housing when so desired for the purpose of fitting a different chain sprocket or otherwise.

Referring to the drawings.

In the drawings like characters of reference indicate corresponding parts in each figure.

Figure 2:
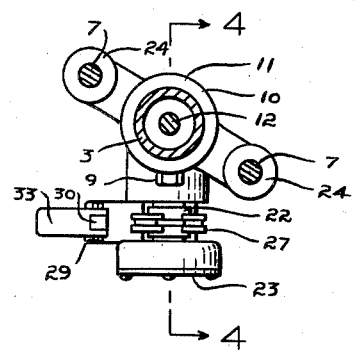
Figure 2 is a plan view taken on the line 2—2 of Figure 1.
Figure 1:
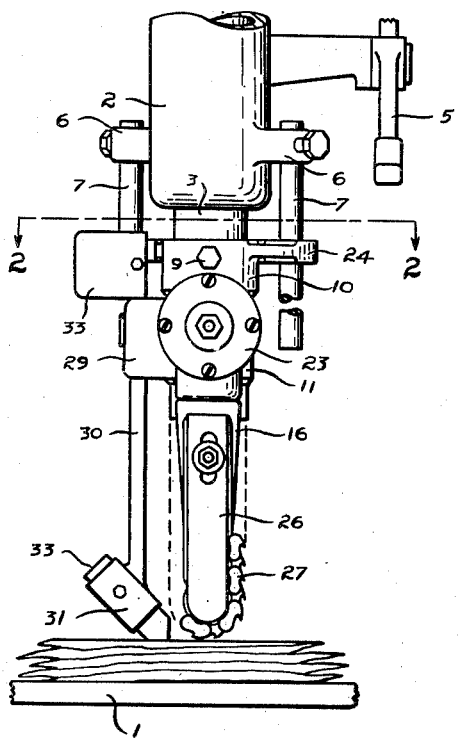
Figure 1 is a front elevational view of the invention attached to the quill of a drill press.

The numeral 1 indicates the bed plate of a drill press and 2 indicates the portion of the head in which the quill 3 is vertically movable in response to movement of the feed lever 5. A pair of lugs 6 are provided upon the opposite sides of the head 2 and support a pair of removably mounted vertical rods or guides 7. Detachably fitted to the lower end of the quill 3 by a bolt 9 is a transmission housing 10 which consists of a sleeve 11 in the base of which the drill spindle 12 is journalled, and extending to the front of said sleeve is a journal box 14 supporting a spaced outer bearing 15 and a slide support 16.

The drill spindle 12 is fitted with a mitre pinion 17. A ball bearing 18 is supported in the journal box 14 and in this and the outer bearing 15 is journalled a horizontal driven shaft 19 having secured thereon a mitre gear 20 in mesh with the mitre pinion and a sprocket 22. The shaft 19 and its bearings are held in position by a flange 23 and the bearings 15 and 18, as well as the shaft mitre gear 20 and and sprocket may be withdrawn from the housing 10 by simply removing the flange 23.

The transmission housing 10 is provided with a pair of diametrically disposed apertured arms 24 which slidably engage the vertical guides 7 to hold the housing against rocking movement about its vertical axis. Adjustably secured vertically upon the slide support 16 is a chain guard 26 and fitted around said guard is a mortise chain 27 which is driven from the sprocket 22. Slidably mounted in a lug 29 extending to one side of the housing 10 is a stem 30 having at its lower end a socket 31 in which an obliquely pointed foot 32 is adjustably secured. The upper end of the stem is fitted with a weight 33 which is adapted to hold the foot 32 in sufficiently firm contact with the surface of the work being acted upon by the mortising chain 27 to prevent splitting of the grain at the point where the chain emerges from the mortise being cut.

Figure 3:
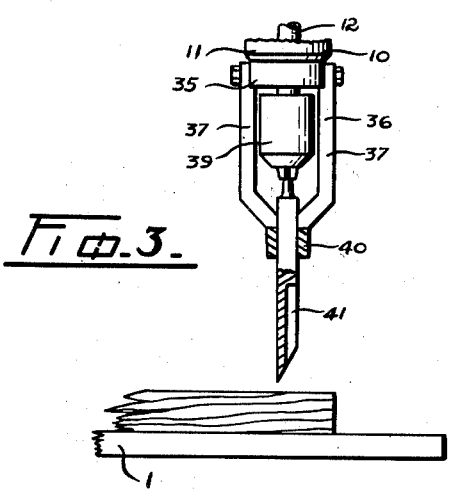
Figure 3 is an elevational view of the lower end of the transmission housing with a mortising chisel attached.
Figure 4:
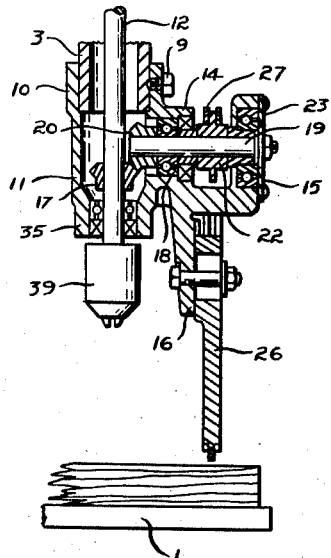
Figure 4 is a sectional view taken on the line 4—4 of Figure 2.

The transmission housing 10 is reduced at its lower end as at 35 to the diameter of the quill 3, so that when desired a yoke 36, see Figure 3, may be attached thereto. The yoke 36 is provided with legs 37 spaced apart to allow a drill chuck 39 to be fitted to the drill spindle 12 and is provided with a sleeve portion 40 at its lower end in which the shank of a mortise chisel 41 may be guided, the chisel being held in the position shown by the drill chuck 39 as shown.

In use, the attachment having been secured to the drill press as above described is forced down to its work by the usual feed lever 5 and the mortising chain is driven from the rotating drill spindle 12 through the horizontal shaft 19. As the transmission 10 moves downwardly it will move along the stem 30 of the foot 32. If it is desired to use the mortising chisel 41 instead of the chain, the housing will preferably be turned 180 degrees to put said chisel to the front of the drill press and if necessary, the chain 27 and the chain guard 26 will be removed. The operating movement will obviously be in this case in response to reciprocating the drill spindle.

What I claim as my invention is:

A chain mortising attachment for a drill press having a head, a quill and a drill spindle, said attachment comprising a sleeve adapted for attachment to the lower end of said quill and having a bearing at its lower end through which the lower end of the drill spindle projects, a horizontal shaft carried by said sleeve, said shaft being mitre gear driven from the drill spindle, a sprocket secured adjacent the outer end of said shaft, a slide support carried from said sleeve, a chain guide mounted upon the slide support, a mortising chain surrounding the sprocket and the chain guide, said chain guide being detachable from the slide support to afford free access to the lower end of the drill spindle.

WILLIAM N. MOSS.

REFERENCES CITED

The following references are of record in the file of this patent:

UNITED STATES PATENTS

| Number | Name | Date |
|---|---|---|
| 621,026 | Brown | Mar. 14, 1899 |
| 646,125 | Meserve | Mar. 27, 1900 |
| 865,118 | Muir | Sept. 3, 1907 |
| 1,170,120 | Slonaker | Feb. 1, 1916 |
| 1,690,697 | Palmu | Nov. 6, 1928 |
| 1,748,213 | Edmond | Feb. 25, 1930 |
| 2,464,660 | White | Mar. 15, 1949 |

FOREIGN PATENTS

| Number | Country | Date |
|---|---|---|
| 138,467 | Great Britain | Feb. 12, 1920 |
| 443,984 | Germany | May 10, 1927 |